United States Patent
Leslie (10) Patent No.: US 10,428,625 B2
(45) Date of Patent: Oct. 1, 2019

(54) EXTENDED POWER SYSTEM FOR DOWNHOLE TOOLS

(71) Applicant: HALLIBURTON ENERGY SERVICES, INC., Houston, TX (US)

(72) Inventor: Scott Thomson Leslie, Aberdeen (GB)

(73) Assignee: Halliburton Energy Services, INC., Houston, TX (US)

( * ) Notice: Subject to any disclaimer, the term of this patent is extended or adjusted under 35 U.S.C. 154(b) by 199 days.

(21) Appl. No.: 15/539,797

(22) PCT Filed: Sep. 28, 2016

(86) PCT No.: PCT/US2016/054159
§ 371 (c)(1),
(2) Date: Jun. 26, 2017

(87) PCT Pub. No.: WO2018/063189
PCT Pub. Date: Apr. 5, 2018

(65) Prior Publication Data
US 2019/0089028 A1    Mar. 21, 2019

(51) Int. Cl.
| | |
|---|---|
| *E21B 41/00* | (2006.01) |
| *H01M 6/16* | (2006.01) |
| *H01M 6/36* | (2006.01) |
| *H01M 6/50* | (2006.01) |
| *H01M 16/00* | (2006.01) |

(52) U.S. Cl.
CPC .......... *E21B 41/0085* (2013.01); *E21B 41/00* (2013.01); *H01M 6/16* (2013.01); *H01M 6/36* (2013.01); *H01M 6/5044* (2013.01); *H01M 16/00* (2013.01); *H01M 2220/10* (2013.01); *H01M 2300/008* (2013.01); *H01M 2300/0068* (2013.01)

(58) Field of Classification Search
CPC .......... H01M 16/00; H01M 6/16; H01M 6/36; H01M 6/5044; H01M 2220/10; H01M 2300/0068; H01M 2300/008; E21B 34/14; E21B 41/0085; E21B 47/06; E21B 47/065
See application file for complete search history.

(56) References Cited

U.S. PATENT DOCUMENTS 7,667,942 B2 * 2/2010 Boling ................. H02J 7/0031
                                                          361/103
9,203,109 B2 * 12/2015 Hu ....................... H01M 10/056
(Continued)

OTHER PUBLICATIONS

International Patent Application No. PCT/US2016/054159, International Search Report and Written Opinion, dated May 10, 2017, 16 pages.

*Primary Examiner* — Robert E Fuller
(74) *Attorney, Agent, or Firm* — Kilpatrick Townsend & Stockton LLP (57) ABSTRACT

A power system may include a primary battery and a reserve battery coupled with an actuator to actuate a downhole tool to perform operations downhole in a wellbore. The reserve battery may include an electrolyte having a solid state at an ambient temperate the wellbore. The primary battery may be coupled to the thermal battery to activate a heat source of the reserve battery. The heat source may generate a heat that melts the electrolyte to a molten state and actuates the reserve battery to transmit power to the actuator.

20 Claims, 4 Drawing Sheets

(56) References Cited

U.S. PATENT DOCUMENTS

| | | | |
|---|---|---|---|
| 2001/0013412 A1* | 8/2001 | Tubel | E21B 34/066 166/250.01 |
| 2012/0088134 A1* | 4/2012 | Wood | E21B 33/064 429/90 |
| 2012/0268074 A1 | 10/2012 | Cooley et al. | |
| 2013/0229142 A1* | 9/2013 | Teodorescu | H02J 7/0054 320/103 |
| 2016/0079608 A1* | 3/2016 | Choi | H01M 6/36 429/50 |

* cited by examiner

EXTENDED POWER SYSTEM FOR DOWNHOLE TOOLS

TECHNICAL FIELD

The present disclosure relates generally to wellbore tools and, more particularly (although not exclusively), to power systems usable to extend the operational lifespan of downhole tools in a wellbore.

BACKGROUND

Various downhole tools can be utilized in a wellbore adjacent to a subterranean formation. In some wells, certain downhole tools may remain downhole permanently or indefinitely to perform intervaled or delayed operations in the wellbore. The length of time and the conditions downhole in the wellbore may each individually, or both collectively, deplete the lifespan of a battery (or other power source) powering an actuator of the downhole tool, which in turn may decrease the operational lifespan of the downhole tool. In some instances, wellbore operations may be temporarily halted to retrieve or replace the battery to allow the downhole tool to complete the wellbore operation.

DETAILED DESCRIPTION

Certain aspects and examples of the present disclosure relate to a power system including a primary battery and a thermally activated reserve battery operable to extend the operational lifespan of a downhole tool to perform operations in a wellbore subsequent to the primary battery depleting. In one example, the primary battery may include a lithium battery and the reserve battery may include a thermal battery. The lithium battery and the thermal battery may be coupled to an actuator of the downhole tool to provide power for actuating the downhole tool to perform operations in the wellbore. The lithium battery may also be coupled to the thermal battery to provide an electrical signal to a heat source of the thermal battery. The electrical signal may cause the heating source to increase in temperature to melt a solid-state electrolyte positioned between an anode and cathode of each cell of the thermal battery. Melting the electrolyte may allow electrical current to be drawn from the thermal battery and transmitted to the actuator to power the downhole tool to complete the wellbore operation.

In some aspects, the lithium battery may provide sole power to the actuator of the downhole tool to perform initial operations in the wellbore. The thermal battery may provide power to the actuator to perform a temporary or final operation in the wellbore after the lithium battery is depleted to an insufficient level to power the downhole tool. A switch positioned between the lithium battery and the thermal battery may close to allow the lithium battery to activate a heat source of the thermal battery to melt the solid-state electrolyte. In some aspects, the switch may be controlled by a processor. The processor may also actuate the lithium battery to power the actuator of the downhole tool. The processor may be coupled to a pressure sensor and a temperature sensor. An operator positioned at the surface of the wellbore may change the ambient pressure or temperature in the wellbore to a predetermined threshold to signal the processor to actuate the lithium battery to power the actuator.

Maintaining the electrolyte in a solid-state prior to activating the heat source may allow the thermal battery to remain inert without depleting the thermal battery prior to it being initiated by activating the heat source. In some aspects, the lithium battery may naturally deplete as the length of time that the downhole tool and the power system of the downhole tool are deployed in the wellbore increases. Further, the increased temperature of the downhole environment may exacerbate the natural depletion of the lithium battery. The power system's ability to use a thermal battery as a reserve battery to actuate the downhole tool may extend the operational lifespan of the downhole tool, resulting in saving of both cost and time. For example, the extended lifespan of the downhole tool may save labor costs and time in retrieving the power system of the downhole tool from the wellbore to replace the lithium battery. Minimizing the need to retrieve and replace the power system may also prevent unnecessary delays in the wellbore operations, resulting in additional savings in operational costs and time.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure. The various figures described below depict examples of implementations for the present disclosure, but should not be used to limit the present disclosure.

Figure 1:
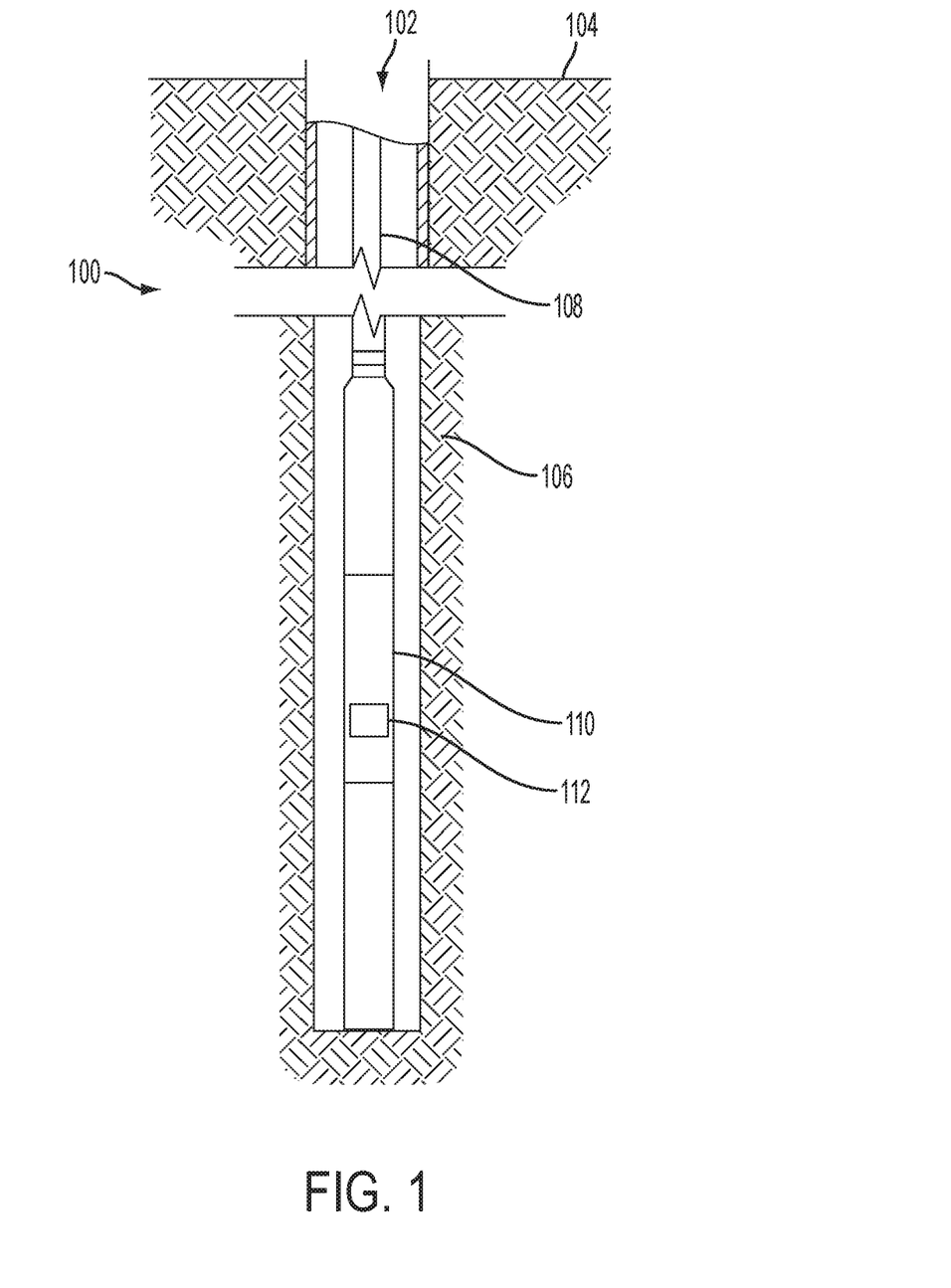
FIG. 1 is a cross-sectional schematic diagram depicting an example of a wellbore environment including a downhole tool according to one aspect of the present disclosure.

Various aspects of the present disclosure may be implemented in various environments. For example, FIG. 1 is a cross-sectional schematic diagram depicting an example of a wellbore environment 100 in which a wellbore tool including a power system according to some aspects of the present disclosure may be deployed. The wellbore environment 100 includes a wellbore 102 extending from a surface of the earth through various earth strata, including a subterranean formation 106 from which hydrocarbons may be extracted using wellbore operations. A tubing string 108 extends from the surface 104 to the subterranean formation 106. In some aspects, the tubing string 108 may consist of segmented pipes and provide a conduit through which formation fluids, such as hydrocarbons produced from the subterranean formation, may travel from the wellbore 102 to the surface 104.

The wellbore environment 100 may include at least one downhole tool 110. The downhole tool 110 may be coupled to the tubing string 108. In some aspects, downhole tool 110 may include any tool usable to perform wellbore operations downhole in the wellbore 102. A non-limiting example of a downhole tool 110 includes a valve, such as an isolation barrier valve. An isolation barrier valve may isolate a zone of the subterranean formation 106 and provide a bi-directional seal subsequent to a completed fracturing and gravel packing operation in another zone of the subterranean formation 106 downhole of the isolation barrier valve. The isolation barrier valve may include a power system 112 including batteries usable to power an actuation mechanism, such as a shifting tool to open and close the valve. The power system 112 may provide power to the actuation mechanism to allow the isolation barrier valve to remain operational for an extended period. Although an isolation barrier valve is described, the downhole tool 110 may include any tool positioned downhole in the wellbore 102 to perform one or more short-term operations downhole in the wellbore 102 and remain in the wellbore 102 for an extended time to perform at least one long-term operation. In some aspects, the long-term operation may include an operation in the wellbore 102 occurring months or a year or more after deployment of the downhole tool 110 into the wellbore 102.

Figure 2:
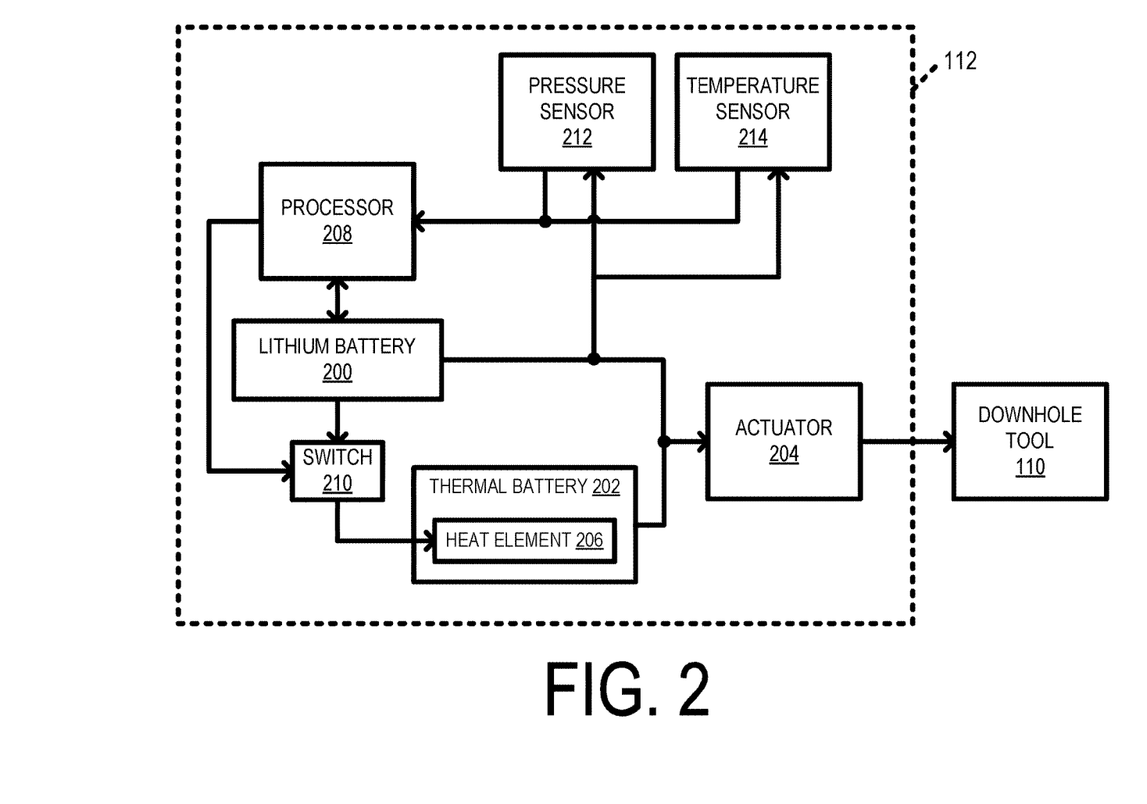
FIG. 2 is a block diagram of a power system for the downhole tool of FIG. 1 according to one aspect of the present disclosure.

FIG. 2 is a block diagram of the power system 112 for the downhole tool 110 of FIG. 1 according to one aspect of the present disclosure. The power system 112 is a multi-battery system that includes a lithium battery 200 and a thermal battery 202 to power an actuator 204 of the downhole tool 110. In some aspects, the lithium battery 200 may serve as the primary battery to transmit power to the actuator 204 to actuate the downhole tool 110. The lithium battery 200 may be comprised of one or more lithium cells. In some aspects, each lithium cell may produce approximately 1.5 volts to 3.7 volts. The size of the lithium battery 200 may depend on the power necessary to actuate the downhole tool 110. In some aspects, each cell may include an anode, cathode, and electrolyte. In one example, the anode may include metallic lithium, the cathode may include manganese dioxide, and the electrolyte may include a salt of lithium that is dissolved in an organic solvent. The lithium battery 200 may include at least 0.15 kilograms of lithium per kilowatt-hour. In some aspects, the lithium battery 200 may include a lithium-ion battery. Although the lithium battery 200 is described, the primary battery for the power system 112 may include any type of battery sufficient to provide power to actuator 204 to actuate the downhole tool 110. For example, the primary battery may include a magnesium battery, aluminum-ion battery, or a dry cell battery.

The thermal battery 202 may serve as the secondary, or reserve, battery for the actuator 204. The thermal battery 202 may include a solid-state electrolyte that maintains a solid state at ambient temperatures in the wellbore. The thermal battery 202 may remain inert when the electrolyte is in its solid state to preserve the full power capacity of the thermal battery 202 without the thermal battery 202 depleting over time. When the electrolyte melts, the thermal battery 202 may become conductive to allow current to traverse the cells of the thermal battery 202 to power the actuator 204.

The thermal battery 202 includes a heat source 206 that may be activated to melt the electrolyte. In some aspects, the heat source may be activated by an electric current flowing from the lithium battery 200 to the thermal battery 202. Non-limiting examples of the heat source may include an electric element, an electric match, an electro-explosive device, such as a squib, or a percussion cap. For example, an electric match may include a device that ignites a combustible compound (e.g., a pyrogen) in response to an electric current being applied to the electric match. A squib may include a small explosive device similar to dynamite that may detonate a tube of an explosive substance in response to an electric current being applied to electric leads of the squib. A percussion cap may include a small cylinder of copper or brass with a closed end containing a shock-sensitive explosive primer (e.g., fulminate of mercury). The explosion created by the heat source 206 may raise the temperature of the electrolyte 304 to the melting point of the electrolyte 304 to convert it to a molten state.

The thermal battery 202 may include one or more cells. In some aspects, the size of the thermal battery 202 may depend on the power necessary to actuate the downhole tool 110.

Figure 3:
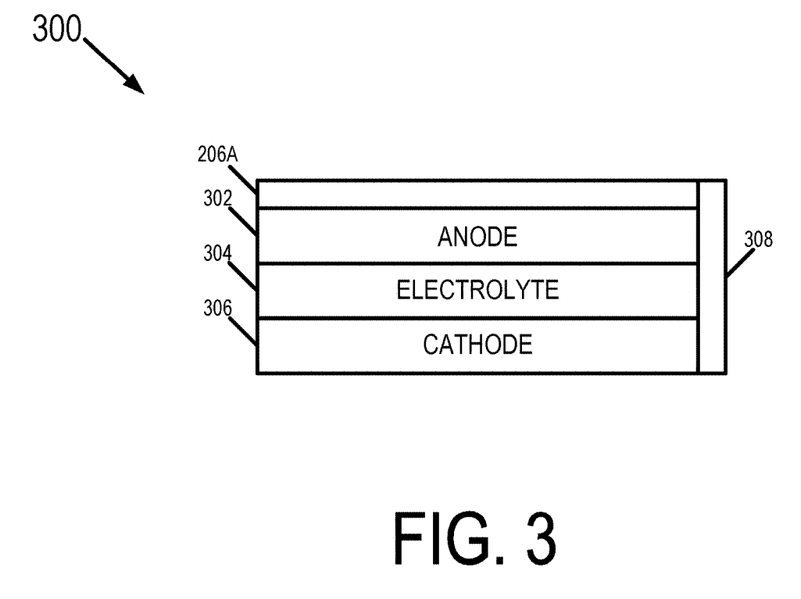
FIG. 3 is a cross-sectional schematic diagram depicting an example of a battery cell for the thermal battery of FIG. 2 according to one aspect of the present disclosure.

FIG. 3 is a cross-sectional schematic diagram depicting an example of a battery cell 300 for the thermal battery 202 of FIG. 2 according to one aspect of the present disclosure. Each battery cell 300 of the thermal battery 202 may include an anode 302, an electrolyte 304, and a cathode 306. The electrolyte 304 may be positioned between the anode 302 and the cathode 306 to physically separate them and control the conductivity of the cell 300. In some aspects, the cells 300 of the thermal battery 202 may be stacked in parallel or serially depending on the size of the thermal battery 202. The anode 302 may serve as the positively charged electrode of the cell 300. In some aspects, the anode 302 may comprise one of lithium, calcium, or magnesium. The cathode 306 may serve as the negatively charged electrode of the cell 300. In some aspects, the cathode 306 may include a chromate or sulfide, such as potassium dichromate ($K_2Cr_2O_7$), pyrite ($FeS_2$), or cobalt sulfide ($CoS_2$). The electrolyte 304 may include a material that is substantially non-conductive when in a solid state to prevent current from flowing from the cathode 306 to the anode 302. In some aspects, the electrolyte 304 may include an inorganic salt, such as lithium chloride, potassium chloride, sodium, or lithium salt. The electrolyte 304 may have a melting point at which the electrolyte 304 may convert to a molten state and have conductive properties to allow electrons to flow between the anode 302 and the cathode 306 to produce an electrical current that may be used to power the actuator 204 of FIG. 2. In some aspects, the melting point of the electrolyte 304 may be higher than an ambient temperature downhole in a wellbore. For example, the ambient temperature downhole in the wellbore may reach temperatures as high as 150 to 175 degrees Centigrade. In some aspects, the melting point may be approximately 300 degrees Centigrade to prevent the ambient temperature of the wellbore from prematurely activating the thermal battery 202. In some aspects, the electrolyte 304 may be chemically manufactured to achieve a desired melting point sufficient for the expected temperatures downhole in the wellbore.

The battery cell 300 also includes a heat source 206A. In some aspects, the heat source 206A may be a component of the heat source 206 of the thermal battery 202 of FIG. 2. For example, each battery cell 300 of the thermal battery 202 may include a heat source 206A to collectively form the heat source 206 of FIG. 2. Each heat source 206A of each battery cell 300 may be connected by a fuse strip 308 that may extend across multiple cells of the thermal battery 202. In some aspects, the fuse strip 308 may receive electric current from the lithium battery 200 of FIG. 2 and transmit the current to the heat source 206A to cause the explosion for melting the electrolyte 304. Although the heat source 206A is shown as separated from the electrolyte 304, the heat source 206A may be positioned adjacent to the electrolyte 304 without departing from the scope of the present disclosure.

Returning to FIG. 2, the actuator 204 may include a device that causes the downhole tool 110 to operate in response to power received from the lithium battery 200 or thermal battery 202. In some aspects, the actuator 204 may be coupled to the lithium battery 200 and the thermal battery 202 in parallel to allow the actuator 204 to receive power from each of the batteries 200, 202 individually. Using the previous example of the downhole tool 110 being a valve, the actuator 204 may include a shifting tool configured to apply a force to open or close the valve in response to receiving an electrical signal from the lithium battery 200 or the thermal battery 202. In other examples, the actuator 204 may include a motor or other actuating means for opening or closing the valve. In some aspects, the actuator 204 may include any device configured to actuate the downhole tool 110 in response to receiving power from the lithium battery or the thermal battery 202.

The power system 112 also includes a processor 208 to actuate the lithium battery 200 to provide power to the actuator 204 of the downhole tool 110, or, in certain instances, to actuate the lithium battery 200 to provide power to the thermal battery 202 to activate the heat source 206. The processor 208 may also be coupled to a switch 210 positioned between the lithium battery 200 and the thermal battery 202 to control the flow of electrical current between the lithium battery and the thermal battery 202. The processor 208 may represent a single processor or a set of processors. In some aspects, the processor 208 may be in communication with a computer-readable medium, such as a random access memory (RAM) coupled to the processor 208. The processor 208 may execute computer-executable program instructions stored in memory. Non-limiting examples of the processor 208 include a microprocessor, a digital signal processor (DSP), an application-specific integrated circuit (ASIC), field programmable gate arrays (FPGAs), and state machines. In some aspects, the processor 208 may further comprise programmable electronic devices such as programmable logic controllers (PLCs), programmable interrupt controllers (PICs), programmable logic devices (PLDs), programmable read-only memories (PROMs), electronically programmable read-only memories (EPROMs or EEPROMs), or other similar devices.

In some aspects, the processor 208 may comprise, or may be in communication with, media, for example computer-readable storage media, that may store instructions that, when executed by the processor 208, can cause the processor 208 to perform the steps described herein as carried out, or assisted, by a processor 208. Examples of computer-readable media may include, but are not limited to, an electronic, optical, magnetic, or other storage device capable of providing a processor with computer-readable instructions. Other examples of media comprise, but are not limited to, memory chips, ROM, RAM, ASICs, configured processors, or any other medium from which a computer processor can read. The processor 208, and the processing, described may be in one or more structures, and may be dispersed through one or more structures. The processor may comprise code for carrying out parts of one or more of the methods (or parts of methods) described herein.

In some aspects, the processor 208 may be configured to monitor the power levels of the lithium battery 200. For example, the processor 208 may additionally be coupled to the lithium battery 200 by a sensor for monitoring the lithium battery's 200 power levels. In response to the processor 208 determining that the power levels of the lithium battery 200 are insufficient to provide power to the actuator 204 to actuate the downhole tool 110, the processor 208 may close the switch to complete an electrical flow path coupling the lithium battery 200 to the thermal battery 202. In some aspects, the power necessary to heat the heat source 206 may be less than the power necessary to cause the actuator 204 to actuate the downhole tool 110. In additional and alternative aspects, the processor 208 may include a timer and may adjust the switch from an open position to a closed position at a predetermined or preprogrammed time after deployment of the downhole tool 110 and the power system 112.

The power system 112 also includes one or more sensors coupled to the processor 208, including a pressure sensor 212 and a temperature sensor 214. The pressure sensor 212 may include a pressure gauge, a pressure transducer, or other sensor means for monitoring the pressure in the wellbore 102. The temperature sensor 214 may include a thermometer, a thermistor, a thermocouple, a resistance thermometer, other sensor means for monitoring the temperature in the wellbore 102. The sensors 212, 214 may be powered by the lithium battery 200. In some aspects, the sensors 212, 214 may also be powered by the thermal battery 202. The sensors 212, 214 may provide measurements of the pressure and temperature in the wellbore, respectively, to the processor 208. The processor 208 may execute instructions to actuate the lithium battery based on a triggering condition determined by the pressure or temperature in the wellbore. In some aspects, an operator of the wellbore may control the power system 112 by intentionally adjusting the pressure or temperature in the wellbore outside of normal wellbore pressures or temperatures to trigger the processor 208 to actuate the lithium battery 200 to provide power to the actuator 204. For example, the operator may adjust pressure gauges positioned at the surface 104 of the wellbore 102 of FIG. 1 to a predetermined pressure or pressure range to signal the processor 208 to actuate the lithium battery 200. In another example, the operator may adjust the temperature by creating an explosion in the wellbore to raise the temperature to a predetermined temperature or temperature range to signal the processor 208 to actuate the lithium battery 200. In additional and alternative aspects, the timer of the processor 208 may cause the triggering condition to actuate the lithium battery 200. For example, the downhole tool may function at specific time intervals and the processor 208 may be preprogrammed to execute instructions to actuate the lithium battery at the specified time intervals. In some aspects, when the switch 210 is in the closed position, the triggering condition may cause the lithium battery 200 to heat source 206 of the thermal battery 202, actuating the thermal battery 202 to provide power to the actuator 204 to actuate the downhole tool 110.

Figure 4:
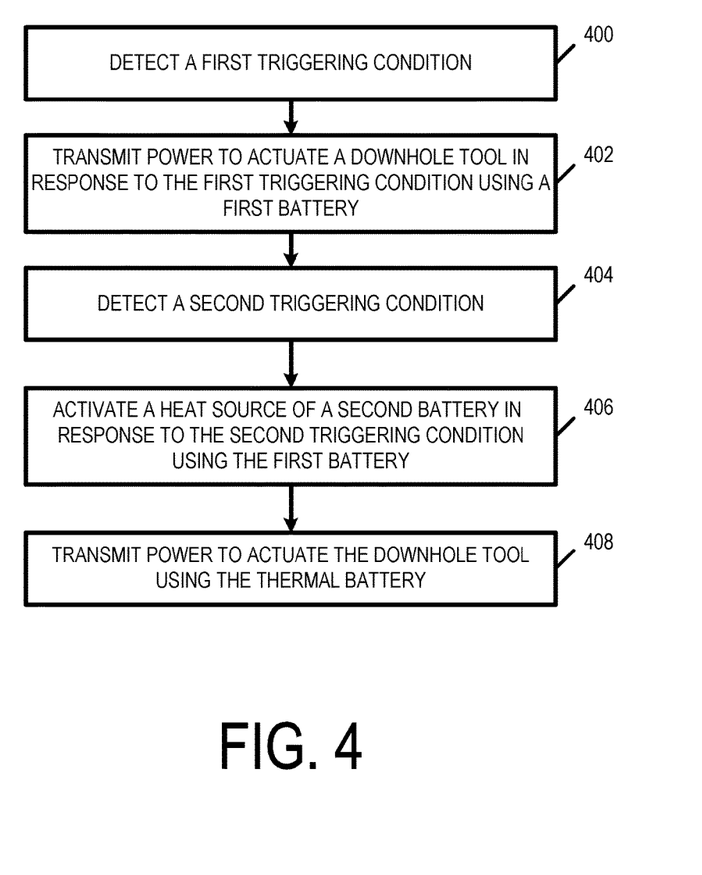
FIG. 4 is a flow chart of a process for actuating the downhole tool of FIG. 1 according to one aspect of the present disclosure.

FIG. 4 is a flow chart of a process for actuating the downhole tool 110 of FIG. 1 according to one aspect of the present disclosure. The process is described with respect to the components of FIGS. 1-3, though other implementations are possible without departing from the scope of the present disclosure.

In block 400, a first triggering condition may be detected. In some aspects, the triggering condition may be detected by the processor 208 in response to a signal received from the pressure sensor 212 or the temperature sensor 214. For example, the pressure sensor 212 may sense the pressure in the wellbore 102 and transmit signals to the processor 208 corresponding to the sensed pressure. Similarly, the temperature sensor 214 may sense the temperature in the wellbore 102 and transmit signals to the processor 208 corresponding to the sensed temperature. The processor 208 may receive the signals from the sensors 212, 214 and detect a triggering condition when one of the temperature or pressure is at a predetermined level or within a predetermined range. In some aspects, the temperature or pressure in the wellbore 102 may be intentionally adjusted by an operator at the surface 104 of the wellbore 102 to signal to the processor 208 to cause the actuator 204 to actuate the downhole tool 110. In other aspects, the triggering condition may correspond to a predetermine time. For example, the processor 208 may include a programmed timer corresponding to times or time intervals programmed by the operator for actuating the downhole tool 110 to perform an operation in the wellbore 102. The processor 208 may detect the programmed time or time interval using the timer. Although the triggering conditions related to pressure, temperature and time are described separately, in some aspects, the processor 208 may detect a triggering condition in response to a combination of conditions monitored by the sensors 212, 214 or the processor's 208 timer.

In block 402, power is transmitted to actuate the downhole tool 110 in response to the triggering condition. In some aspects, the processor 208, in response to detecting the triggering condition, may actuate the lithium battery 200 to transmit power to the actuator 204 to actuate the downhole tool 110. In some aspects, the processor 208 may monitor the power level of the lithium battery 200 to determine if the power level is sufficient for the actuator 204 to actuate the downhole tool 110. In response to determining that the power level is inefficient, the processor 208 may actuate the switch 210 to move to a closed position to complete an electric flow path between the lithium battery 200 and the thermal battery 202 to allow the thermal battery 202 to provide power to the actuator 204 when future triggering conditions are detected. In other aspects, the processor 208 may include a timer and actuate the switch to close in response to an indication from the timer.

In block 404, a second triggering condition is detected. In some aspects, the processor may detect the second triggering condition in a same manner as described for detecting the first triggering event. For example, the pressure sensor 212 or the temperature sensor 214 may sense a temperature or pressure in the wellbore 102 intentionally manipulated by an operator at the surface 104 of the wellbore 102 to signal to the processor 208 to cause the actuator 204 to actuate the downhole tool 110. In some aspects, the second triggering condition may occur after the first triggering condition. For example, the first triggering condition may occur soon after the downhole tool 110 and the power system 112 are deployed in the wellbore 102 to signal the processor 208 to cause the downhole tool 110 to perform one or more initial operations in the wellbore 102. In some aspects, the second triggering condition may be detected days, months, or a year or more later than the first triggering condition. In additional aspects, the second triggering condition may occur after the lithium battery 200 has been depleted to a level no longer sufficient to power the actuator 204. For example, the lithium battery 200 may be naturally depleted due to the elapsed time until the second triggering condition. In another example, the increased temperature in the wellbore 102 may exacerbate the depletion of the lithium battery 200.

In block 406, the heat source 206 of the thermal battery 202 is activated in response to the second triggering condition. In some aspects, the processor 208 may, in response to detecting the triggering condition, actuate the lithium battery 200. The lithium battery 200 may be depleted and unable to provide sufficient power to the actuator 204 to actuate the downhole tool 110. But, the lithium battery 200 may have sufficient power to activate the heat source 206. Subsequent to the processor 208 actuating the lithium battery 200 in response to the second triggering condition, the lithium battery 200 may transmit an electric signal (e.g., a power voltage signal) to the heat source 206 to cause the heat source to heat up. The heat of the heat source 206 may melt the electrolyte 304 in each cell 300 of the thermal battery 202 from a solid state to a molten state. The molten state of the electrolyte 304 in each cell 300 may allow the thermal battery 202 to generate electrical current.

In block 408, power is transmitted to actuate the downhole tool 110. In some aspects, the power may be transmitted by the thermal battery 202 to the actuator 204 to actuate the downhole tool 110. In some aspects, the power transmitted by the thermal battery 202 may allow the actuator 204 to actuate the downhole tool 110 to perform a signal wellbore operation. In other aspects, the power transmitted by the thermal battery 202 may allow the actuator 204 to actuate the downhole tool 110 temporarily for a limited amount of time (e.g., minutes or one to two hours).

In some aspects, systems and methods may be provided according to one or more, or a combination of any portion, of the following examples:

Example 1

A power system for a downhole tool may include a primary battery. The power system may also include a reserve battery coupled to the primary battery. The reserve battery may include an anode. The reserve battery may also include a cathode. The reserve battery may also include a solid-state electrolyte disposed between the anode and the cathode and meltable by a heat source to change from a solid state, at which the solid-state electrolyte prevents the reserve battery from providing power to an actuator, to a molten state, at which the reserve battery provides power to the actuator to actuate a downhole tool.

Example 2

The power system of example 1 may also include a processor couplable to the primary battery to actuate the primary battery in response to a triggering condition. The triggering condition may include at least one of a predetermined temperature in a wellbore or a predetermined pressure in the wellbore.

Example 3

The power system of examples 1-2 may also include a pressure sensor coupled to the processor and positionable to monitor a pressure in the wellbore.

Example 4

The power system of examples 1-3 may also include a temperature sensor coupled to the processor and positionable to monitor a temperature in the wellbore.

Example 5

The power system of examples 1-4 may also include a switch communicatively coupled to the processor and positioned between the primary battery and the reserve battery.

Example 6

The power system of examples 1-5 may also include a processor communicatively couplable to the primary battery to monitor a power level of the primary battery.

Example 7

The power system of examples 1-6 may feature the downhole tool being a valve, wherein the actuator is positionable proximate to the valve to open or close the valve.

Example 8

The power system of examples 1-7 may feature the heat source including one of an electric element, an electric match, a squib, or a percussion cap.

Example 9

The power system of examples 1-8 may feature the solid-state electrolyte including at least one of lithium chloride, potassium chloride, or sodium.

Example 10

The power system of examples 1-9 may feature the primary battery being a lithium battery.

Example 11

A method for actuating a downhole tool may include detecting, by a sensor, a first triggering condition. The method may also include transmitting power, by a first battery, to actuate the downhole tool to perform a first wellbore operation in response to the first triggering condition in a wellbore. The method may also include detecting, by the sensor, a second triggering condition, the second triggering condition occurring after the first triggering condition. The method may also include activating, by the first battery, a heat source of a second battery to actuate the second battery in response to the second triggering condition in the wellbore. The method may also include transmitting power, by the second battery, to actuate the downhole tool to perform a second wellbore operation.

Example 12

The method of example 11 may feature the sensor including a pressure sensor. Detecting the first triggering condition may include detecting, by the pressure sensor, a pressure in the wellbore generated by an operator as a signal to actuate the downhole tool to perform the first wellbore operation.

Example 13

The method of examples 11-12 may feature detecting the second triggering condition to include detecting, by the pressure sensor, a second pressure in the wellbore generated by the operator as a second signal to actuate the downhole tool to perform the second wellbore operation.

Example 14

The method of examples 11-13 may feature activating the heat source of the second battery to include melting, by heat generated from the heat source, a solid-state electrolyte positioned between an anode and a cathode of the second battery to actuate the second battery.

Example 15

The method of example 14 may feature the solid-state electrolyte including at least one of lithium chloride, potassium chloride, or sodium.

Example 16

The method of examples 11-15 may feature activating the heat source of the second battery to include transmitting an electric signal from the first battery to the heat source. The heat source may include one of an electric element, an electric match, a squib, or a percussion cap.

Example 17

The method of examples 11-16 may feature the first battery being a lithium battery.

Example 18

A system may include a downhole tool positionable in a wellbore. The system may also include an actuator coupled to the downhole tool. The system may also include a thermal battery coupled to the actuator. The thermal battery may include an anode. The thermal battery may also include a cathode. The thermal battery may also include a heat source. The thermal battery may also include a solid-state electrolyte disposed between the anode and the cathode and meltable by the heat source to change from a solid state, at which the solid-state electrolyte prevents the thermal battery from providing power to the actuator, to a molten state at which the thermal battery provides power to the actuator to actuate the downhole tool. The system may also include a switch coupled to the thermal battery and movable between an open position to prevent an electric signal from actuating the heat source and a closed position to allow the electric signal to activate the heat source. The system may also include a processor coupled to the switch, wherein the switch is actuatable by the processor.

Example 19

The system of example 18 may also include a lithium battery coupled to the processor and the thermal battery. The switch may be positioned between the lithium battery and the thermal battery. The lithium battery may be actuatable by the processor to generate the electric signal.

Example 20

The system of examples 18-19 may feature the downhole tool being a valve. The actuator may include a shifting tool positionable proximate the valve to open and close the valve.

The foregoing description of the examples, including illustrated examples, has been presented only for the purpose of illustration and description and is not intended to be exhaustive or to limit the subject matter to the precise forms disclosed. Numerous modifications, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:

1. A power system, comprising:
    a primary battery for transmitting power to an actuator configured to actuate a downhole tool;
    a heat source coupled to the primary battery, the heat source being configured to receive an electrical signal from the primary battery and responsively generate heat; and
    a reserve battery coupled to the heat source, the reserve battery including:
        an anode;
        a cathode; and
        a solid-state electrolyte disposed between the anode and the cathode and meltable by the heat source to change from a solid state, at which the solid-state electrolyte prevents the reserve battery from providing power to the actuator, to a molten state, at which the reserve battery provides power to the actuator to actuate the downhole tool.

2. The power system of claim 1, further comprising a processor coupled to the primary battery to actuate the primary battery in response to a triggering condition, the triggering condition including at least one of a predetermined temperature in a wellbore or a predetermined pressure in the wellbore.

3. The power system of claim 2, further including a pressure sensor coupled to the processor and configured to monitor a pressure in the wellbore.

4. The power system of claim 2, further including a temperature sensor coupled to the processor and configured to monitor a temperature in the wellbore.

5. The power system of claim 2, further including a switch communicatively coupled to the processor and positioned between the primary battery and the reserve battery, the processor being configured to operate the switch for causing the primary battery to transmit the electrical signal to the heat source.

6. The power system of claim 5, wherein the processor is configured to monitor a power level of the primary battery and actuate the switch in response to the power level of the primary battery falling below a predefined threshold.

7. The power system of claim 1, wherein the downhole tool is a valve, wherein the actuator is coupled to the valve to open or close the valve.

8. The power system of claim 1, wherein the heat source includes one of an electric element, an electric match, a squib, or a percussion cap.

9. The power system of claim 1, wherein the solid-state electrolyte includes at least one of lithium chloride, potassium chloride, or sodium.

10. The power system of claim 1, wherein the primary battery is a lithium battery.

11. A method for actuating a downhole tool, comprising:
    detecting, by a sensor, a first triggering condition;
    transmitting power, by a first battery, to actuate the downhole tool to perform a first wellbore operation in response to the first triggering condition in a wellbore;
    detecting, by the sensor, a second triggering condition, the second triggering condition occurring after the first triggering condition;
    activating, by the first battery, a heat source of a second battery to actuate the second battery in response to the second triggering condition in the wellbore; and
    transmitting power, by the second battery, to actuate the downhole tool to perform a second wellbore operation.

12. The method of claim 11, wherein the sensor includes a pressure sensor,
    wherein detecting the first triggering condition includes detecting, by the pressure sensor, a pressure in the wellbore generated by an operator as a signal to actuate the downhole tool to perform the first wellbore operation.

13. The method of claim 12, wherein detecting the second triggering condition includes detecting, by the pressure sensor, a second pressure in the wellbore generated by the operator as a second signal to actuate the downhole tool to perform the second wellbore operation.

14. The method of claim 11, wherein activating the heat source of the second battery includes melting, by heat generated from the heat source, a solid-state electrolyte positioned between an anode and a cathode of the second battery to actuate the second battery.

15. The method of claim 14, wherein the solid-state electrolyte includes at least one of lithium chloride, potassium chloride, or sodium.

16. The method of claim 11, wherein activating the heat source of the second battery includes transmitting an electric signal from the first battery to the heat source,
    wherein the heat source includes one of an electric element, an electric match, a squib, or a percussion cap.

17. The method of claim 11, wherein the first battery is a lithium battery.

18. A system, comprising:
    a downhole tool positionable in a wellbore;
    an actuator coupled to the downhole tool for actuating the downhole tool;
    a primary battery configured to supply power to the actuator for actuating the downhole tool;
    a thermal battery coupled to the actuator, the thermal battery including:
        an anode;
        a cathode;
        a heat source configured to receive an electrical signal from the primary battery and responsively generate heat; and
        a solid-state electrolyte disposed between the anode and the cathode and meltable by the heat source to change from a solid state, at which the solid-state electrolyte prevents the thermal battery from providing power to the actuator, to a molten state at which the thermal battery provides power to the actuator to actuate the downhole tool;
    a switch coupled between the primary battery and the thermal battery, the switch being movable between an open position to prevent the electric signal from actuating the heat source and a closed position to allow the electric signal to activate the heat source; and
    a processor coupled to the switch, the processor being configured to operate the switch in response to detecting at least one triggering condition in the wellbore.

19. The system of claim 18, wherein the primary battery is a lithium battery.

20. The system of claim 18, wherein the downhole tool is a valve, and wherein the actuator is a shifting tool configured to open and close the valve.

* * * * *